June 26, 1951 H. J. NICHOLS 2,557,991
AUTOMATIC ENGINE SYNCHRONIZER
Original Filed June 6, 1941 2 Sheets-Sheet 1

Inventor
H. J. NICHOLS
By Emery Holcombe & Blair
Attorneys

June 26, 1951          H. J. NICHOLS          2,557,991
AUTOMATIC ENGINE SYNCHRONIZER
Original Filed June 6, 1941          2 Sheets—Sheet 2
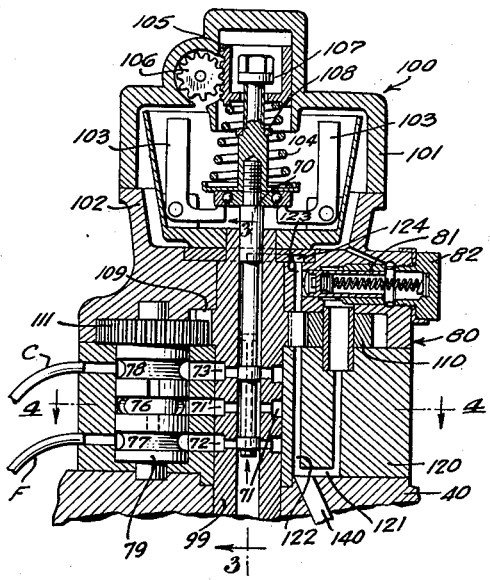
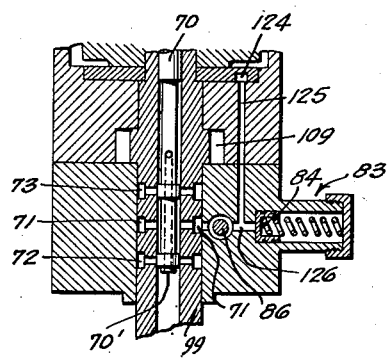
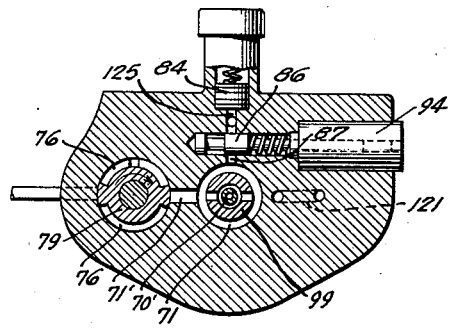
Inventor
H. J. NICHOLS
By Emery Holcombe & Roux
Attorneys Patented June 26, 1951

2,557,991

UNITED STATES PATENT OFFICE 2,557,991

AUTOMATIC ENGINE SYNCHRONIZER

Harry J. Nichols, New York, N. Y.

Original application June 6, 1941, Serial No. 396,936, now Patent No. 2,423,400, dated July 1, 1947. Divided and this application December 16, 1944, Serial No. 568,497

16 Claims. (Cl. 170—135.29)

This invention relates to automatic synchronizing systems for engines. More particularly it relates to automatic synchronizing systems for controlling the relative rotations of a plurality of engines, such as the propeller driving engines of a multi-engine airplane, so as to establish and maintain the revolutions of said engines in isochronous rotation and in substantially constant phase relation, that is to say, so that the engines rotate not only at the same speed, but also in predetermined rotational relation with respect to an invariable part of their respective cycles of rotation. Engines so rotating are said to be running in unison.

This application is a division of my application Serial No. 396,936, filed June 6, 1941, which issued as U. S. Letters Patent No. 2,423,400, dated July 1, 1947.

It is well known that in the operation of installations of multi-engines intended to run at the same speed, any variation in the speed of the individual engines produces undesirable and harmful vibrations. It is also known that when ordinary speed regulating governors are utilized to control the speed of the individual engines of a multi-engine installation, even when the governors of the individual engines are most carefully adjusted to the same speed setting, pronounced rhythms and minor variations in the engine speeds may occur, producing undesired "beats" and vibrations. Moreover, large periodically moving parts of adjacent engines, such as pistons and connecting rods, may produce unwanted resonant effects when the engines are running at the same speed, unless measures are taken to keep the engines "out of step." Hence, such installations require constant attendance and monitoring by an operator to keep the engines running in smooth relation. This situation applies particularly to multi-engine airplanes having controllable pitch propellers under governor control, hence the present invention will be described and illustrated with particular reference to such application. It is to be understood, however, that the invention is generally applicable to the synchronization of a plurality of engines or prime movers to obtain smooth running.

A principal object of the invention is to provide automatic synchronizing apparatus especially adapted for use in connection with centrifugal speed regulating governors for the individual engines of a multi-engine installation, thereby to establish and maintain unison of the several engines.

A further object of the invention is to provide means whereby a plurality of propellers, driven by individual engines, can be synchronized automatically. That is they can be established and maintained in rotation isochronously and substantially in constant phase relation without monitoring by an operator. According to the invention, for purposes of such synchronization, any one of the plurality of propeller engines can be selected to function as the pace setter or leader, while the other engines are caused by their self-synchronizing governor to function as followers or slaves, their speeds being corrected individually to keep them in synchronism with the selected leader.

A further object is to supplement the usual speed-regulating governor with auxiliary phase-correcting means whereby synchronism of a plurality of engines can be accurately and automatically maintained indefinitely.

A further object is to provide synchronizing control apparatus which is responsive to a change in rotary speed, or relative phase, or both.

A further object is to provide auxiliary phase regulating means for use in conjunction with speed regulating governors thereby to perfect the speed regulation for purposes of automatic synchronization.

In the drawings:

Fig. 2 is an axial section of a typical speed governor provided with a synchro-valve embodying part of the invention.

Fig. 3 is a part axial section of the governor of Fig. 2, but taken at right angles thereto on line 3—3 of Fig. 2.

Fig. 4 is a part section on line 4—4 of Fig. 2.

Figure 1:
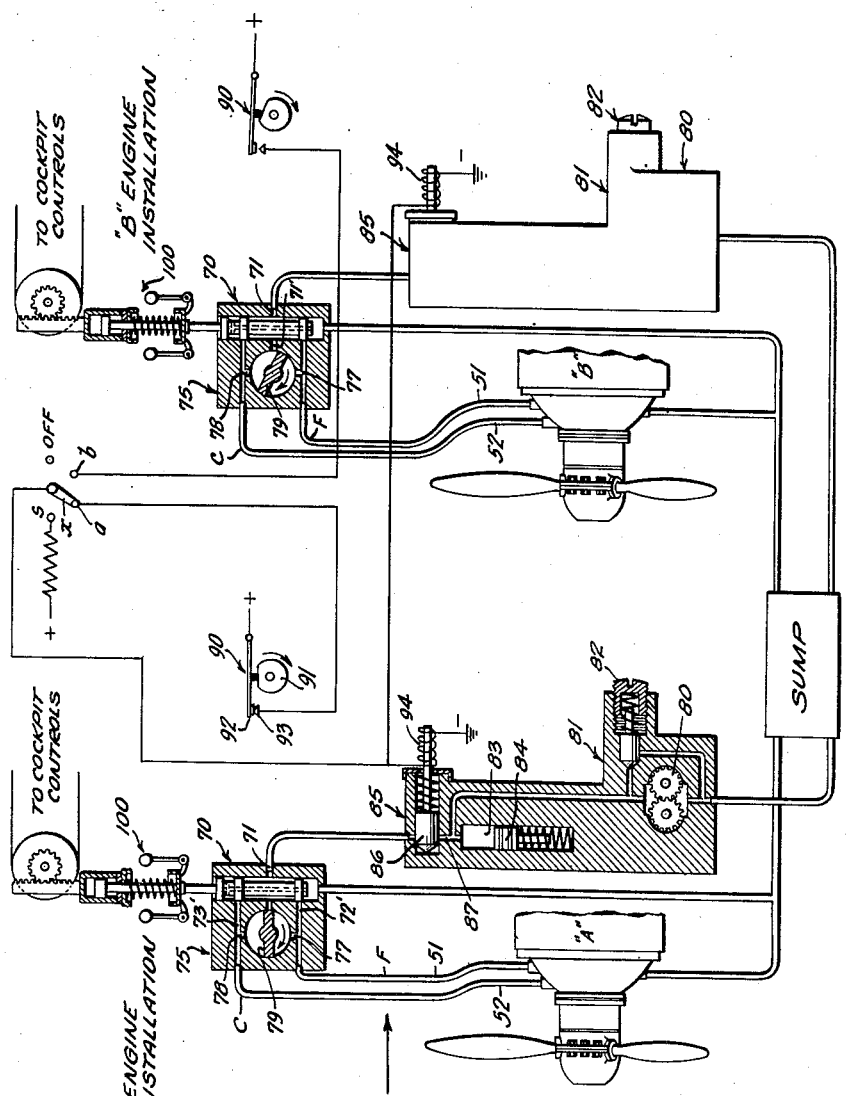
Fig. 1 is a schematic diagram of a typical multi-engine system driving controllable pitch propellers and including the synchronizing features of the invention.

Referring now to Fig. 1, the simplified multi-engine, hydraulic, propeller pitch-control system there schematically shown utilizes a typical speed-control governor, and typical pitch-control mechanism, such as that shown in my U. S. Letters Patent, No. 2,423,400, issued July 1, 1947; and in addition special and novel devices forming part of the present invention for purposes of automatic synchronization, all particularly adapted to multi-engine, constant-speed controllable pitch propeller installations for aircraft. In such installations, a practical problem of operation is presented by the surge and resonant vibration effects due to the "beat" effect of powerful engines running at approximately or exactly the same speed, but not in true unison.

It is known that the objectionable "beat" effects can be eliminated by proper synchronous operation of all engines, and that is the purpose of the embodiment now to be described.

The first of the special synchronizing devices is a pulsator device for producing timed fluid control pulses indicative of the speed of rotation and a certain rotational position or phase of a master rotary element. In Fig. 1, the pulsator device is shown for illustrative purposes as comprising a cam-actuated circuit closer 90 driven by an associated rotary engine or device controlling a solenoid-actuated, plunger valve 85 which, in conjunction with pump 80, periodically produces a discrete fluid impulse indicative of the speed and phase of the master rotary element, be it a rotary element of the engine, the propeller, or a master speed device functioning as the pace setter. In the case shown cam 91 can be considered as being driven by its associated engine when that engine has been selected to function as leader.

However, in adapting the invention to typical control systems, the pulsator apparatus can have other forms so long as it is capable of producing timed fluid impulses of the control medium indicative of the periodicity and phase of the master rotary element of the synchronizing system. For example, the periodic current impulses produced by circuit closer 90 could serve as the phase indicator of the crank shaft of the engine by which it is driven, or of a propeller which the engine drives through reduction gearing or of an independent master timing device producing impulses of proper speed. Likewise, the pulsator means could comprise a rotary valve adapted to produce a pulse for each revolution.

The small accumulator cylinder 83, while not an essential part of the pulsator system, aids in producing discrete fluid impulses more efficiently. Between impulses, the pump 80 charges the accumulator cylinder against the spring-loaded piston 84 therein.

The second of the special devices is a phasing device, herein termed the synchro-valve 75, which automatically compares the phase, that is to say the relative angular position, of a follower rotary element with the master rotary element in the synchronizing system, and also produces corrective effects to establish and maintain unison. Here again, alternative or equivalent forms of the phasing device, such as a cam driven selector valve, can be utilized in some cases in adapting the invention to typical control systems.

By means of the phase comparing and phase correcting devices of the invention in conjunction with the pitch-changing mechanism and control elements already described (or equivalent apparatus) the automatic synchronization of a plurality of propellers or engines can be effected.

Turning now to Fig. 1 in detail, the electrical circuit closer 90, of any suitable construction, as for example a cam-operated contactor as shown, is assumed to be driven at the leader speed, although in practical operation it may be driven at half speed, or at some other appropriate proportional speed. During a fraction of a revolution of the cam 91, say ⅛ revolution, the circuit closer contacts close and supply a pulse of electrical current to energize the solenoid 94. In response to the energization of the solenoid 94, the plunger 86 momentarily opens the duct 87, so that fluid under pressure is delivered by accumulator 83 in the form of a pulse via the connecting conduit to the inlet port 71 of the governor selector valve 70.

The fluid supplied by pump 80 is assumed to be under sufficient pressure so that when fluid pulses are applied to the pitch control mechanism, substantial pitch control action will ensue. But at other stages of the control cycle, the fluid pressure beyond the valve 85, due to leakage or bleeding, remains below the effective control level. Thus while limited fluid pressure may be applied by the governor 100 or the synchro-valve 75 to the pitch control mechanism at any time, the fluid pressure is only effective for control action during the pulse stage, and therefore the fluid pulses effectively represent for control purposes the speed and a predetermined phase of the leader by which the pulsator is driven.

The synchro-valve 75, which may be located in the hydraulic system between the governor valve 70 and the pitch control mechanism as shown but in any case in series with the pulsator valve, has an inlet port 71' connected to the inlet port 71 of the governor, and hence to the pulsator valve, and has outlet ports 77—78 connected to the hydraulic fluid conduits F and C leading to the pitch control mechanism as indicated. Synchro-valve 75 also has a rotary valve element, shown as a rotary synchro vane 79, driven by and in proper ratio to the speed of its associated engine, which engine also drives the associated governor 100. Hence one end or the other of the vane can be caused to cover the inlet port 71' substantially during each pulse arrival when its associated driver is functioning as pace-setter.

This rotary synchro vane 79 is in a sense the functional inverse of the pulsator cam 91, in that it represents the phase of its driver, but by contrast it blocks the transmission of fluid during a fraction of a revolution comparable to the duration of the received control impulse, and permits transmission of fluid during substantially the remainder of the revolution. Furthermore, by its momentary angular position relative to the arrival of the control pulses at the inlet port 71', the vane 79 compares the phase of its driver with that of the pulsator driver. This function of comparing the phase of the follower with that of the pace-setter is as essential to the synchronizing system described as the function of comparing the speed of its driver with that of a standard speed is to a speed governing system.

*The synchronizing governor*

Referring to Fig. 2 generally, the governor 100 there shown has the combined functions of regulating the engine speed and establishing and maintaining synchronism by control of the propeller pitch as described hereinafter. The speed regulating function is exercized by a well-known type of speed-calibrated fly-weight hydraulic governor which has been widely applied to the control of constant-speed controllable pitch propellers. The automatic synchronizing function, however, is accomplished by special additional features and because of this unique additional function, the governor as a whole is termed a synchronizing governor. The principle and construction of fly-weight governors being well known, extensive description here is deemed unnecessary. However, the novel features relating particularly to the invention will be pointed out and fully described.

Referring now to Figs. 2–4 in detail, the governor assembly comprises a head 101, and body 102, the latter mounted with a pad 120 on an engine casing 40. Within the head and body is a revolving fly-weight mechanism 103 driven by the neck 99, which in turn is driven by the engine at a desired speed ratio proportional to the engine speed in the usual manner. The neck 99 is provided with ports 71, 72, and 73; and encloses slidable valve-plunger 70. The fly-weight mechanism includes two pivoted centrifugal bell-cranks or "fly-balls" 103 operating against a speeder-spring 104, the latter being adjustably tensioned by rack 105 and pinion 106 to set the desired engine speed. Stops 107 and 108, secured on plunger 70, limit the speed range and enable the plunger to be moved arbitrarily up or down by the cock-pit controls, but provide a working range therebetween. In Figs. 2 and 3 the plunger 70 is shown in the mid neutral position.

The neck 99 is also provided with a gear 109 which drives a mating gear 110 to form a fluid pump 80, in well known manner. The pump 80 is provided with a spring loaded pressure-relief valve 81. This relief valve can be equipped, according to common practice, for quick increase of the spring pressure for propeller feathering.

The gear 109 also meshes with a gear 111 which rotates the synchro-vane 79 at the proper predetermined speed ratio. The synchro-vane is provided with two arcuate opposite grooves 76 (one being in view in Fig. 2) connected vertically on opposite sides with ring ports 77 and 78 respectively, the actual arrangement being equivalent to the diagrammatic rotating vane 79 of Fig. 1.

Referring to Figs. 3 and 4 in connection with Fig. 2, suitable ducts 121—125 in pad 120, assembled between the engine 40 and the governor body 102, connect the oil column of the suction duct 140 (leading from the oil supply pump to the governor boss) to valve 81, and thence to the annular duct 124. Thence the oil descends by duct 125 (see Fig. 3) to radial duct 126 to connect with the accumulator 83, and the pulsator valve (indicated by plunger 86) which normally severs the oil column at that point. Other minor ducts connect the ports of the neck 99 to the pulsator valve 86 and to the synchro-valve (see Fig. 2).

Briefly, the operation of the governor in connection with speed regulation is as follows: The switch X is moved to the "S" or start position and the cock-pit controls are manipulated by the pilot or operator to move the rack 105 to adjust the compression force on speeder-spring 104 to the calibrated speed level. The governor thereupon slides plunger 70 up or down, according to whether the fly-weights move radially out or in at the existing speed, and thereby regulates the propeller pitch changing mechanism to enable the engine to run at the desired speed. At substantially calibrated speed, the fly-weight force and the spring force balance, bringing the plunger 70 to rest in the neutral position as shown in Figs. 2 and 3. The leader engine is then selected by the operator by means of switch X (Fig. 1), whereupon the solenoid pulsator valves are periodically energized by the operative circuit closer 90 driven by the selected leader engine as previously described. The pulsator plunger 86 admits pulses of fluid to the inlet port 71 of neck 99, and to the inlet port 71' of the synchro-valve. Depending on the phase relation of vane 79 with reference to the inlet port 71' at the instant of arrival of successive pulses, as described in connection with synchronization, the pitch-changing mechanism is further regulated by vane 79 in micrometric degree to establish and maintain synchronism of the follower engine with the leader engine. Naturally, if the propellers are driven at engine speed, or at a fixed ratio thereto as usually practiced, the propellers are likewise automatically maintained in synchronism.

*Automatic synchronization*

The operation of the automatic synchronizing system is as follows: Let engine "A," assumed to be driving cam 91, represent the master element, and engine "B" the follower element. The preliminary operation of bringing both the master and follower engines to the desired approximate or parity speed is accomplished by the operator who by reference to calibrated speed indicating instruments, as for example engine tachometers, sets the respective engine throttles and governor controls at the proper settings. Whereupon, the engines deliver the requisite power and the governors automatically adjust the pitch of the respective propellers to obtain constant speed under the existing operating conditions as previously described. (During this period of establishing speed parity, the solenoid pulsator valves can be kept open by throwing the pulsator switch X to the "S" or start position, thereby increasing the governor action. On reaching speed parity, the switch X should be moved either to the "a" or "b" position, thereby to select one engine or the other to act as leader.)

Assuming now that the circuit closer cam 91 is driven by engine "A" (which cam indirectly actuates the pulsators of both engines as indicated in Fig. 1) and that the low point of this cam represents the master reference phase, while the synchro-vane 79 of engine "B" represents the follower phase, it is evident that as the engine speeds approach but do not attain exact parity there will be a gradual relative precession in phase between these elements one way or the other. Let it be supposed that engine "B" is the faster. Hence, after reaching the speed where the "B" synchro-vane 79 covers the inlet port 71' during the pulse interval, the "B" synchro-vane 79 will thereafter advance or lead in phase relative to the arrival of the impulse at the inlet port. As it does so, the inlet port 71' becomes uncovered during the pulse interval, as indicated for engine "B" in Fig. 1, and the pulses will be admitted by the "B" synchro-vane to the inlet 78, leading to the "C" conduit, without any necessity of speed-governor action. The resulting coarsening of the pitch will tend to slow down the follower engine, hence eventually the speed of the follower will be below parity and the synchro-vane will begin to retrogress. It will continue to do so until the inlet port 71' is again covered during the pulse interval, and thereafter the synchro-vane will lag in phase with respect to the pulses. Thereupon, the pulses will be admitted to port 77 and the "F" conduit to fine the pitch. As before, this corrective action is accomplished solely by the agency of the synchro-valve, without governor action. Assuming that the synchro-vane "overshoots" and commences to lead on the next excursion, the speeds will be nearer parity and the corrective action will be less. Thus, like a heavily damped pendulum, the synchro-vane will quickly bring its associated follower engine into step at the mean of its swings, whereat the port 71' is closed by the synchro-vane 79 in coincidence with the pulse arrival, as for engine "A" in the figure. This is the stable condition of unison or perfect synchronism.

Synchronism having been automatically established as just described, the synchro-valve of the follower engine thereafter functions as a micrometric speed adjuster by correcting the phase of the follower engine responsively to any change of relative phase, so as to maintain synchronism, and the governor is relieved of any speed adjusting function during minor speed variations. But with respect to major speed adjustments due to varying loads, etc., the governor functions in normal manner to maintain constant speed. Final parity of speed and true synchronism of each follower engine are thus automatically established and maintained by its individual synchro-valve.

Hence, in effect the synchronizing additions provide not only a form of micrometric speed adjustment, but also automatically correct the phase of the follower to perfect the synchronization so as to obtain substantial unison. This is believed to be a novel and highly advantageous feature for precision governors, applicable generally to the governing and automatic synchronization of engines of various types.

It will be apparent to those skilled in the art that the principles and constructions of the two-engine automatic synchronizing system as described can be extended to multi-engine installations generally merely by duplication of minor additions of conventional apparatus such as switches, etc.

Without further explanation or discussion, it is believed that the foregoing conveys a good understanding of the manifold novel features and advantages characterizing the invention. These features and advantages cooperate harmoniously with the essential considerations in speed governors to provide a light weight, reliable, compact, efficient inexpensive and relatively simple automatic synchronizer.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention and therefore such adaptations should and are intended to be comprehended within the meaning and range of equivalency of the following claims.

I claim:

1. In automatic synchronizing apparatus for a system of mechanically independent rotary power drivers, in combination, centrifugal speed governing means for regulating the rotary speed of each of said drivers, means for producing periodic hydraulic impulses each indicative of the completion of a certain cycle of rotary motion of a selected one of said drivers, and means for automatically utilizing said impulses to establish and maintain synchronism of the other of said drivers with respect to said selected driver.

2. In governor apparatus for synchronizing a system of rotary mechanical power drivers, speed-control means, including centrifugally actuated mechanism, for governing the rotary speed of each of said drivers, pulsator means including a rotary element driven by one of said drivers for producing timed hydraulic impulses indicative of the speed and phase of its associated driver, and means including a rotary element driven by a second driver for utilizing said impulses to adjust the speed of said second driver to rotate in unison with the first named driver.

3. In synchronizing control apparatus for a rotary mechanical power driver, in combination, centrifugal speed regulating means for said driver, rotary phase correcting means for said driver, and hydraulic controlled means for varying the load torque responsively to the joint control of said speed regulating means and said phase correcting means.

4. In synchronizing control apparatus for controlling the speed of a plurality of engines, in combination, a centrifugal speed regulating governor for each engine, means for generating impulses indicative of the speed and phase of one of the engines, and means operatively associated individually with each of the other engines for utilizing said impulses to regulate the speed and phase of its associated engine, thereby to cause all of said engines to rotate in unison.

5. In a self-synchronizing speed governor, the combination of a centrifugal speed-responsive device, a hydraulic regulating valve actuated by said device, an auxiliary rotary hydraulic regulating valve, and means for rotating said device and said rotary valve in fixed rotary relation.

6. In a system of controllable pitch propellers, a drive engine for rotating each propeller, pitch-control means operatively associated with each propeller, and hydraulic synchronizing means for causing the said propellers to rotate in unison by controlling the pitch thereof including speed-governor means for each pitch control means, means including a pulsator for producing timed hydraulic pulses, and means responsive to said hydraulic pulses for automatically regulating the pitch control means as required to establish and maintain unison of rotation of said propellers.

7. In driving and synchronizing means for a plurality of controllable pitch propellers, a driver motor for rotating each propeller, pitch control means operatively associated with each propeller, and means for synchronizing said propellers including adjustable means for governing the speed of each motor under varying operating conditions thereby to establish substantial speed parity of the propellers, means for generating timed hydraulic pulses indicative of the phase of one selected propeller, and hydraulic means for comparing the phase of others of the propellers with the phase of the one selected propeller and regulating the pitch control means as required to establish and maintain unison of rotation of the several propellers.

8. In synchronizing means for a plurality of motors independently driving controllable pitch propellers, individual means for governing the speed of the motors, and means automatically operative to establish and maintain synchronism of said plurality of motors, including impulse generating means for producing timed impulses indicative of the phase of a selected leader motor, and means for utilizing said impulses to compare the phase of a follower motor with the leader motor and accordingly regulating the phase of said follower motor so as to bring said follower motor into unison with said leader motor.

9. In synchronizing speed-control means for controllable pitch propellers, in combination, individual speed-governing means for each propeller, and automatic synchronizing means for at least one of said propellers, including means for generating periodic hydraulic impulses each indicative of the phase of a rotary controlling element, and hydraulic means for comparing the phase of a rotary controlled element with that of said controlling element and for regulating accordingly the pitch of a controlled propeller so as to establish and maintain unison of rotation with the said controlling element.

10. In a system of controllable pitch propellers, in combination, driving means for rotating each propeller independently, means for adjusting the pitch of each propeller; and speed-governor means for causing said driving means to rotate in unison, including an adjustable constant-speed control device for each driving means, means for generating periodic hydraulic impulses, and automatic synchronizing means for utilizing said periodic hydraulic impulses to actuate said pitch adjusting means jointly with said constant-speed control device, thereby to establish and maintain unison of rotation between the said driving means.

11. In a synchronizing system for a plurality of controllable pitch propellers, in combination, drive means for rotating each of said propellers independently, individual constant-speed governor means for regulating the speed of each said drive means by varying the pitch of its associated propeller, a rotary leader element motionally coordinated with an individual drive means, means operatively associated with said leader element for producing periodic hydraulic impulses indicative of the speed and phase of said individual drive means, a phase-comparing rotary device motionally coordinated with another propeller drive means, and means for utilizing said periodic impulses to synchronize said rotary device with said leader element.

12. In an automatic synchronizing system for engines, the combination of means for regulating the speed of an engine, and hydraulic means forming a part of said system and motionally coordinated with the rotation of said engine for comparing the speed of rotation and phase of said engine with respect to timed hydraulic control impulses produced by a pace-setter.

13. In an automatic synchronizing system for engines, the combination of governor means for regulating the speed of each engine, a rotary pace-setter, means for producing timed hydraulic control impulses indicative of the rotations of said pace-setter, hydraulic means for comparing the speed and phase of a follower engine with the timed impulses, and means responsive to such comparison for controlling said follower engine so as to synchronize its rotations with the rotations of the pace-setter.

14. A synchronizing control system for synchronizing the rotations of a system of rotary units including, in combination, speed regulating means, including a governor, for each rotary unit; means for selecting one of said units to act as a master unit; means for producing timed hydraulic impulses indicative of the speed and phase of said selected master unit; and auxiliary speed control means operatively associated with each of said other units for utilizing said impulses to regulate the rotations of its associated unit jointly with the governor of that unit so as to cause said unit to rotate in unison with said selected master unit.

15. In an automatic synchronizing control for synchronizing the rotations of a power unit with those of a master unit, the combination of a centrifugally actuated governor for controlling a speed regulating hydraulic valve, and a rotary phase regulating hydraulic valve operatively associated with said governor for comparing the rotational phase of said power unit with that of said master unit and acting jointly with said governor to synchronize the rotations of said power unit with those of said master unit.

16. Control apparatus for synchronizing the rotations of a follower rotary unit with those of a master rotary unit including, in combination, means operatively associated with said master unit for producing hydraulic impulses indicating the rotations of said master unit, and means operatively associated with said follower unit for utilizing said hydraulic impulses in synchronizing the rotations of said units.

HARRY J. NICHOLS.

REFERENCES CITED

The following references are of record in the file of this patent:

UNITED STATES PATENTS

| Number | Name | Date |
| --- | --- | --- |
| 1,886,975 | Profitlich | Nov. 8, 1932 |
| 2,153,470 | McNeil | Apr. 4, 1939 |
| 2,173,913 | Morehouse | Sept. 26, 1939 |
| 2,224,177 | Algarsson | Dec. 10, 1940 |
| 2,250,695 | Algarsson | July 29, 1941 |
| 2,254,970 | MacNeil | Sept. 2, 1941 |
| 2,296,177 | Newton | Sept. 15, 1942 |
| 2,319,218 | Drake | May 18, 1943 |
| 2,330,070 | Martin et al. | Sept. 21, 1943 |
| 2,340,994 | Smith | Feb. 8, 1944 |
| 2,374,276 | French | Apr. 24, 1945 |